US006476833B1

(12) United States Patent
Moshfeghi

(10) Patent No.: US 6,476,833 B1
(45) Date of Patent: Nov. 5, 2002

(54) METHOD AND APPARATUS FOR CONTROLLING BROWSER FUNCTIONALITY IN THE CONTEXT OF AN APPLICATION

(75) Inventor: Mehran Moshfeghi, Sunnyvale, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/281,393

(22) Filed: Mar. 30, 1999

(51) Int. Cl.$^7$ .................................................. G06F 3/74
(52) U.S. Cl. ........................................ 345/854; 345/762
(58) Field of Search ................................. 345/745, 742, 345/751, 759, 839, 744, 968, 853, 854, 762

(56) References Cited

U.S. PATENT DOCUMENTS

| | | | | |
|---|---|---|---|---|
| 5,784,564 | A | | 7/1998 | Camaisa et al. |
| 5,796,395 | A | * | 8/1998 | De Hond ................. 345/744 |
| 6,177,936 | B1 | * | 1/2001 | Cragun ................... 345/781 |
| 6,266,060 | B1 | * | 7/2001 | Roth ...................... 345/853 |

FOREIGN PATENT DOCUMENTS

| | | | | |
|---|---|---|---|---|
| WO | WO9715008 | | 4/1997 | ........... G06F/11/00 |
| WO | WO9740446 | | 10/1997 | ........... G06F/11/30 |
| WO | WO9832076 | | 7/1998 | ........... G06F/13/38 |
| WO | WO9837480 | | 8/1998 | ........... G06F/1/00 |
| WO | WO 9845793 | | 10/1998 | ........... G06F/17/30 |
| WO | WO9848546 | | 10/1998 | ........... H04L/29/06 |

OTHER PUBLICATIONS

"Look Ahead Filtering on Internet Content" IBM Technical Disclosure Bulletin, US IBM Corp. New York, vol. 40, No. 12, Dec. 1, 1997, pp. 143.

* cited by examiner

*Primary Examiner*—Cao H. Nguyen
(74) *Attorney, Agent, or Firm*—John Vodopia

(57) ABSTRACT

This invention includes methods and apparatus for browsing markup language documents from within the context of a client-server application running on an end-user device. Browser functionality, which is configured according to user profile information specifying each user's authorization and preferences, is embedded in the application, and can be activated by application controls. While some users have unrestricted authorization and access, others are restricted to certain browser functions and to certain allowed network resources. This restriction is enforced by preventing the browser functionality from generating network addresses that are not on a list of allowed network addresses also present in the user profile information. Network access restriction is achieved, in part, by filtering markup language documents before display to delete linking information that is not allowed. Document filtering methods are presented for Hypertext Markup Language (HTML) and extensible Markup Language (XML) documents. The document filtering methods are extendable to additional markup languages.

28 Claims, 8 Drawing Sheets

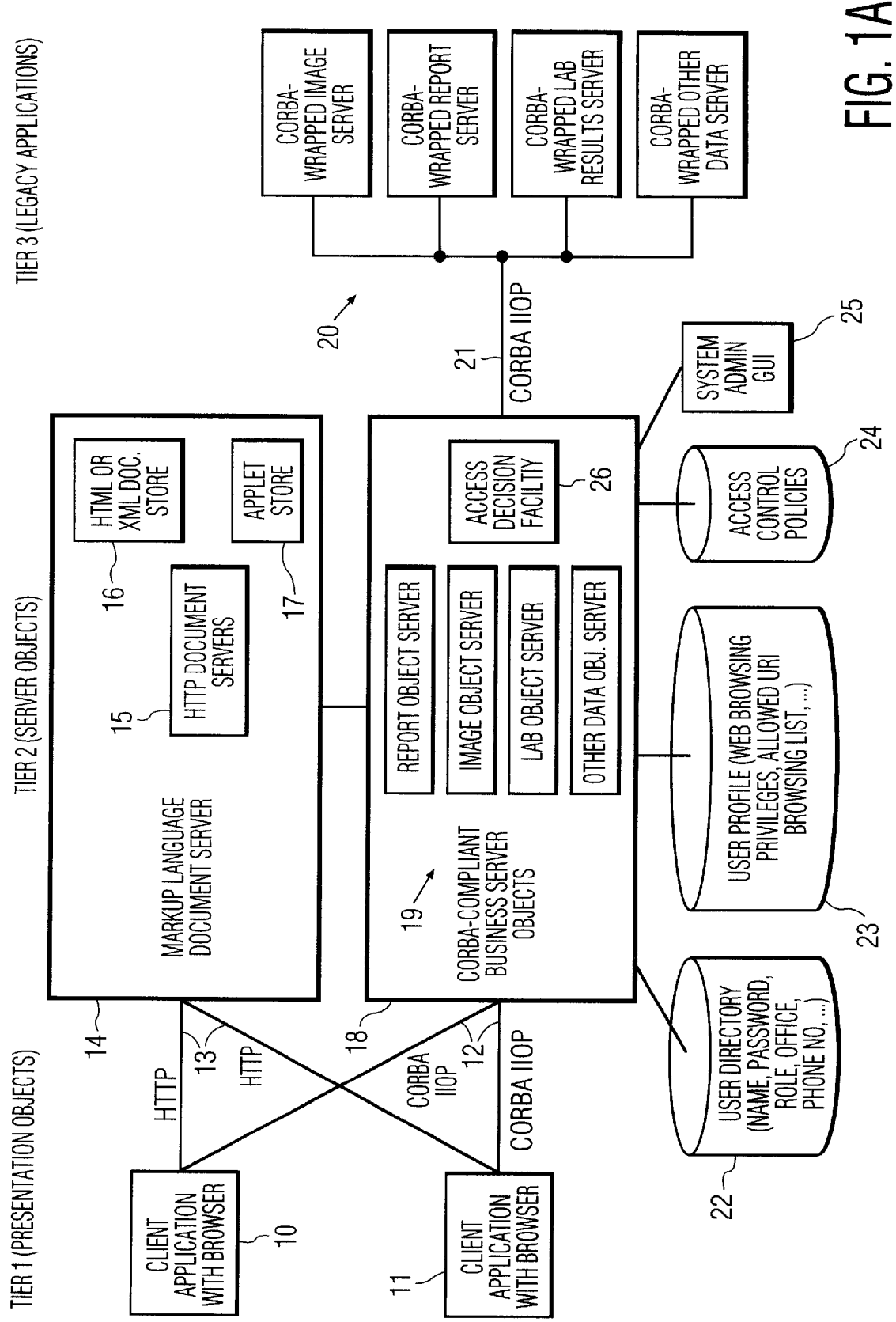

METHOD AND APPARATUS FOR CONTROLLING BROWSER FUNCTIONALITY IN THE CONTEXT OF AN APPLICATION

BACKGROUND OF THE INVENTION

1. Field of the Invention

This invention includes methods and apparatus relating generally to browsing markup language documents across a network from within the context of a client application program, and specifically to restricting access only to allowed network resources and to allowed browser interface functions.

2. Description of Related Art

The public Internet and private intranets allow client programs on one computer to exchange information with server programs on other computers. World Wide Web (WWW) browsers are a type of client program that provide easy-to-use, virtually standardized, graphical access for browsing hypertext information formatted in markup language documents.

However, most business applications perform other non-browsing tasks and require specialized interfaces. Attempts to provide a browser-like interface for application-oriented business tasks are likely to lead to undesirable user interfaces. See, e.g., Nielson, 1998, "Does Internet=Web?", Jakob Nielson's Alertbox for Sep. 20, 1998. For example, e-mail applications like Lotus Notes, Outlook Express or Eudora are more professional with greater functionality than simple browser-like WWW e-mail interfaces (e.g., Hotmail). Likewise, other vertical market stand-alone business applications provide more features and functions than can be supported in a standard browser.

However, it is often useful to provide for markup language browsing while remaining in the application context. In one alternative, the application may have a sub-window with some of the functionality of a standard browser. This window is not a separate window but is an embedded window that is an integral part of the application. Such a feature allows browsing of hypertext information without needing to exit the application and starting a separate browser application, such as Navigator of Netscape Corp. or Internet Explorer of Microsoft.

Accessing and displaying markup language documents in the application context is typically different from standard browsing sessions. In standard browsing, a user can enter any Uniform Resource Identifier (URI) or click on any displayed link to access any desired content or resource. See, e.g., Internet Engineering Task Force, 1994, Uniform Resource Locators (URLs) RFC 1738; Internet Engineering Task Force, 1995, Relative Uniform Resource Locators—RFC 1808. However, in order to remain productive, browsing from the application context, should typically be focused and related to the application. For example, it can be more productive to permit access only to relevant documents and resources.

Accordingly, it is important that any browser functionality embedded in the application context be configurable for focused productive use.

Markup languages are widely used, especially for Internet content. Generally, markup languages are documents with text, images, and embedded markup tags which specify the desired display formatting of the document. In the past, Internet markup language hypertext documents have been largely limited to the Hypertext Markup Language (HTML).

However, new markup languages are being introduced for specialized and general use. For example, special markup languages are being developed which are designed for use in consumer appliances. A newer general markup language is the extensible Markup Language (XML), being developed by the World Wide Web Consortium (W3C). XML may become a virtually universal markup language of the Internet in the future. Most producers of commercial browser have committed to supporting XML in future releases.

In detail, XML is a restricted form of the Standard Generalized Markup Language (SGML), which is also designed for use on the WWW. XML has many potential applications such as separation of structure from presentation, intelligent searching, messaging formats, and data converters.

XML became a W3C recommendation in February 1998. See, e.g., World Wide Web Consortium, 1998, extensible Markup Language (XML) Version 1.0, Recommendation 10. The W3C is developing a number of XML-related standards. An important standard is the XML Linking Language, or XLink. See, e.g., World Wide Web Consortium, 1998, XML Linking Language (XLink), Working Draft 3-March. XLink describes linking information constructs that can be inserted into XML resources or documents to describe links between resources. XLink uses XML syntax to create one directional links (like HTML) as well as more complex multidirectional links.

Other XML standards include the extensible Stylesheet Language (XSL) being designed for presentation of XML documents. See, e.g., World Wide Web Consortium, 1998, extensible Stylesheet Language (XSL), Version 1.0. XML name spaces are being designed to provide a simple method for qualifying element and attribute names used in XML documents by associating them with name spaces identified by URI references. See, e.g., World Wide Web Consortium, 1998, Name spaces in XML. The Document Object Model (DOM) is designed for modeling document elements as objects and for providing an interface allowing programs and scripts to dynamically access and update document content, structure, and style. See, e.g., World Wide Web Consortium, 1998, Document Object Model (DOM) Level 1 Specification, Version 1.0. The XML Pointer Language (XPointer) is designed for reference to elements, character strings, and other parts of XML documents. See, e.g., World Wide Web Consortium, 1998, XML Pointer Language (Xpointer).

Accordingly, it is also important that browser functionality embedded in the application context be adaptable to HTML, XML and other markup languages being developed.

Citation of a reference herein, or throughout this specification, is not to be construed as an admission that such reference is prior art to the Applicant's invention of the matter subsequently claimed.

SUMMARY OF THE INVENTION

General objects of the present invention are to provide methods and apparatus which overcome the above identified requirement and lacks in the current art.

Specific objects of the present invention include methods and apparatus providing configurable markup language browser functionality embedded in the context of a client-server application running on standard end-user devices. The browser functionality of this invention is configurable so that the network resources accessible by a user are restricted in order to focus the user's attention to pre-determined relevant content. Such configuration may also be used to block possibly offensive documents. Further, the browser functionality is configurable so that certain users are prevented for utilizing certain browser features. The browser configuration and allowed network access are separately customizable for each user. This invention is applicable both to HTML and XML documents and also to documents formatted in emerging markup languages.

Accordingly, this invention includes methods and apparatus for browsing markup language documents from within the context of an executing application. This is achieved by embedded browser functionality that can be activated to display an embedded browser sub-window inside the main application window. While the prior art provides the same resource access rights and browser interface functions to all users, the present invention provides methods and apparatus where some users are allowed to access any resource on the public Internet or private intranets, while other users can only access the limited lists of resources set forth in the content of their user profile. Further, the functionality and appearance of the user interface of the embedded browser sub-window is also configured from information in the user profile. The administrator of the system in which an application according to this invention is installed can change the resource access and browsing function privileges of users by editing the content of their user profiles.

Network resource access is restricted by preventing the embedded browser functionality from generating linking information that is not allowed. In a preferred embodiment, a user with restricted Web browsing privileges is not presented any location field in the browser sub-window, into which URIs that are not allowed can be entered by the user. Also, in the preferred embodiment, if an allowed document is delivered from its server with links to other documents that are not allowed, these links are filtered from the document before it is displayed in the browser sub-window. Therefore, a restricted user can not access documents that are not allowed by activating displayed linking information. Such a user can access network resources only by allowed links present in displayed and filtered markup language documents. Optionally, the browser dynamically creates a personalized user home page listing all links allowed to the user.

Filtering methods are described for HTML and for XML, These methods can also be applied to other emerging markup languages, such as those being developed for consumer appliances. Preferably, the application is implemented in Java. If so, optionally, it can be an applet downloaded and executed in commercially available markup language browsers.

In a first embodiment this invention includes an apparatus for a user to browse markup language documents, the documents being stored for retrieval at one or more computer systems attached to a network and containing linking information representing resource addresses, the apparatus comprising: an end-user device comprising processor, memory, network attachment, and display, wherein the memory stores user profile records whose contents describe the characteristics and preferences of the user, an application program comprising (i) instructions for causing the processor to perform an application function which displays an application window including application specific controls and data, wherein the application specific controls are responsive to the content of the user profile records and comprise a browser control, and (ii) instructions for causing the processor to perform, responsive to user activation of the browser control, a browser function which displays within the application window a browser sub-window including browser specific controls and markup language documents, wherein both the displayed browser specific controls and any linking information retained present in the displayed markup language documents are responsive to the content of the user profile records.

In a first aspect of the first embodiment, this invention includes the apparatus of the first embodiment wherein the browser specific controls comprise a location entry field for entry of linking information representing resource addresses, and wherein display or not of the location entry field is responsive to the contents of the user profile records.

In a second embodiment, this invention includes a method for a user to browse markup language documents at an end-user device, the documents being stored for retrieval at one or more computer systems attached to a network and containing linking information representing resource addresses, the method comprising: entering user identification information, authenticating entered user identification information and loading user profile records associated with the authenticated user to the end-user device, displaying an application window at the end-user device including application specific controls and data, wherein the application specific controls are responsive to the content of the user profile records and comprise a browser control, displaying, within the application window and responsively to user activation of the browser control, a browser sub-window including browser specific controls and markup language documents, wherein both the displayed browser specific controls and any linking information retained in the displayed markup language documents are responsive to the content of the user profile records.

BRIEF DESCRIPTION OF THE DRAWING

Other objects, features and advantages of the present invention will become apparent upon perusal of the following detailed description when taken in conjunction with the appended drawing wherein:

FIGS. 1A–B illustrates an exemplary client-server architecture and end-user device to which this invention is applicable;

DETAILED DESCRIPTION OF THE PREFERRED EMBODIMENT

Figure 1B:
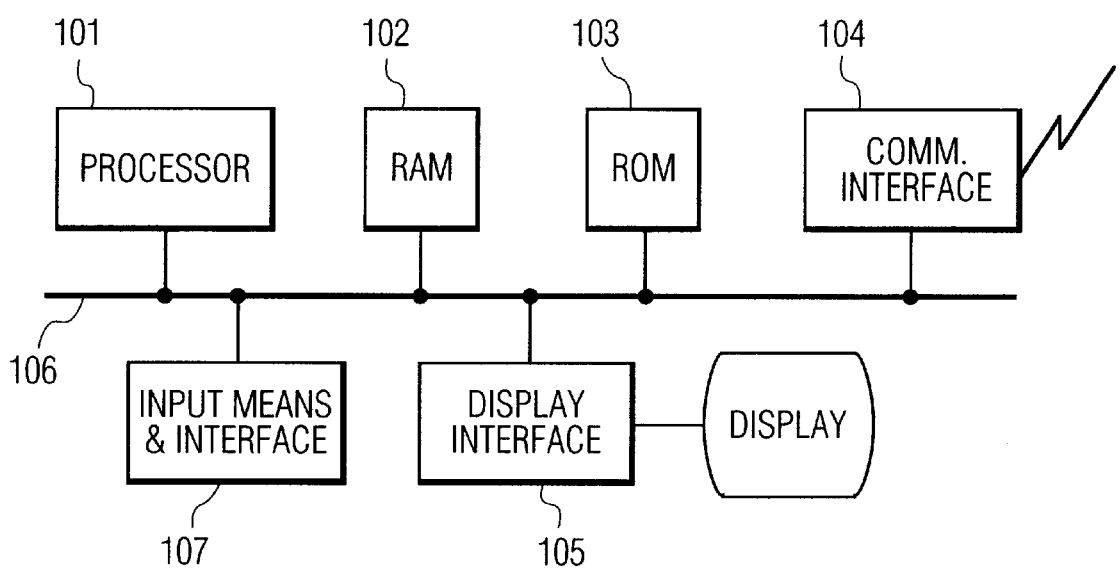

In the following, in section 1, an exemplary client-server system architecture, to which the methods and apparatus of the present invention are advantageously applied, is first described. Next, in section 2, detailed descriptions of the browser functionality of the present invention and its implementation are presented. Finally, in section 3, methods for filtering markup language documents are described Where necessary, the detailed description also includes concise discussions of necessary technical background.

1. Client-server System

1.1. Architecture Overview

FIG. 1A illustrates an exemplary 3-tier client-server architecture applied to computerized medical records (CPR) distribution. This architecture is based jointly on a distributed object architecture in which Common Object Request Broker Architecture (CORBA) compliant object request brokers (ORB) communicate using Internet Inter-ORB Protocol (IIOP) to connect and on markup language document transfer from servers to clients using the Hypertext Transfer Protocol (HTTP). The network illustrates is preferably the public Internet or private intranets. The CORBA family of distributed object standards are developed and published by the Object Management Group. The HTTP and related internet protocols are developed and published by the Internet Engineering Task Force.

This client-server system of this figure, which is described in this subsection, is exemplary, being used for concreteness and ease of the subsequent description. The system and architecture is not to be understood as limiting, since the methods and apparatus of this invention are equally applicable to other client-server architectures, such as 2-tier client-server architectures, as well as to client-server architectures not based on CORBA. For example, if the illustrated business server objects and the front-end clients are all implemented in Java then Sun Microsystems' Remote Method Invocation (RMI) technology can be used instead of the CORBA architecture. Alternatively the Distributed Component Object Model (DCOM) of the Microsoft Corp. can be used in place of CORBA.

Further, this exemplary architecture is applied, again for purposes of concreteness and ease of description only, to the distribution of computerized medical records for physicians, patients, and other users. This application is also to be understood as not being limiting, since one of ordinary skill in the art will appreciate how to adapt this invention to other application fields. Accordingly, the present invention encompasses not only application to CPR distribution, but to other vertical market domains and their applications, such as banking, insurance, airlines, hotels, transportation, and so forth.

With reference again to FIG. 1A, the first tier of the three tier system is illustrated to comprise end-user devices 10 and 11, which in turn comprise, at least, a processor, static and dynamic memory, a display, input means, and a communication interface. The end-user devices can be standard PCS, such as desktop, workstation or notebook machines. They can equally be Internet appliances, such as WebTVs, screen-telephones, PDAs, etc., or even other types of information appliances with communication capabilities.

The end-user devices run front-end client software including an application providing visual display of business data, markup language documents, and other resources available across the public Internet or private intranets. A user interacts with the user interface on the display of the end-user device presented by the client application software to send or request information from network-connected, tier-2 server systems.

Preferably, the application software is structured in a distributed object-oriented manner, so that, for example, the business data appears as business server objects 19. Also it is preferable that distributed objects be structured as CORBA-compliant client objects that interact with distributed CORBA-compliant server objects. CORBA clients and servers, using ORBs resident on their end-user devices or computers, communicate using IIOP over exemplary network links 12. Client objects include stubs generated using CORBA's Interface Definition Language (IDL) in order to remotely invoke methods on the distributed server objects. Finally, this software is also preferably implemented in the Java language in a platform-independent manner and installable as either a complete application or as an applet downloadable from a markup language document server for use in a browser.

According to this invention, the application software also includes markup language document browser functionality. Such browser functionality preferably acts as a client using the HTTP protocol to request markup language documents from servers over exemplary network links 13. The browser functionality then displays the received documents as instructed by the formatting markups in the documents. Secure HTTP (s-HTTP) is preferably used where secure HTTP connections are desired. The secure socket layer (SSL) protocol can also provide security at the socket layer for IIOP communication. The system illustrated in FIG. 1A allows both browser/HTTP and ORB/IIOP requests and responses to flow on the same network.

The middle tier, or tier 2, of the three tier client-server architecture is illustrated to include markup language document server systems 14 and business server object systems 18. Document server systems 14 are illustrated as running HTTP document server function 15, which responds to requests from HTTP clients, and provides, among other resources, HTML, XML, or other markup language documents from document store 16, and Java applets from applet store 17. Applets according to the HTML and XML markup languages are referenced with the <APPLET> tag. One or more HTTP document server functions and associated stores can be resident on one or more HTTP server systems, and can be physically located anywhere on the network.

Business server systems 18 are illustrated as running CORBA-compliant business-server objects 19, which individually respond to remote method invocations for specific type of data from client objects, which in turn are part of the application software running in the end-user devices. The CORBA-compliant business-server objects implement basic business logic of the business application of the client-server architecture, and thereby provide a dynamically generated and integrated view of the different tier-3 data servers. Illustrated in FIG. 1A are separate business server objects for particular classes of data stored in the client-server architecture; alternately, one business-server object can respond to requests for more than one type of data. The business server objects can run in the same system process, in different system processes, on the same computer system, or on different computer systems. Although illustrated as resident on separate system 14 and 18, alternatively HTTP servers and CORBA servers can also be co-resident on the same computer system.

The third tier, or tier 3, is illustrated to include one or more data-server systems 20 communicating with business-server object systems 18 over exemplary network links 21. These data-server systems run data-server objects that present a CORBA-compliant object-oriented interface for the various classes of data stored on these systems. Data server objects can include existing non-object-oriented legacy data stores and applications that have been interfaced using CORBA-compliant IDL, i.e., "CORBA-wrapped" legacy systems. See, e.g., Orfali et al., 1997, Client/Server Programming with Java and CORBA, ISBN 0-471-16351-1, John Wiley & Sons, 1997 (a CORBA and Java reference). Alternatively, these data-server objects can be initially designed in an object-oriented fashion with CORBA-compliant interfaces. Such systems do not need to be CORBA-wrapped.

For concreteness, FIG. 1A illustrates an exemplary application of this three-tier client-server architecture to computerized patient record (CPR) distribution. Accordingly, second tier business-server objects and corresponding third tier data-server objects are illustrated for data types such as medical reports, medical images, lab results, and other types of medical data. Other appropriate business server objects not illustrated can provide general system functions such as session management, medical event notification, system security, display personalization, paging notification, patient-list retrieval, bookmarking, patient arrival and discharge, patient demographics, message exchange, database connection management, and so forth.

1.2. The End-user Device

The application software with the embedded browser functionality according to this invention runs on programmable end-user devices with network communication capabilities. These can range from specialized information appliances to standard PCs, as known in the art.

As illustrated in FIG. 1B, these devices preferably include, at least, the following common structures known in the art: microprocessor 101, long-term ROM memory 103, dynamic RAM memory 102, display interface and display 105, communication interface 104, input interface and means 107, and interconnect 106. Long-term memory can also include magnetic and optical devices. The display can be, for example, an LCD with an LCD controller. The input means can be such known devices as a keyboard, mouse, touch screen, buttons, voice recognition, and so forth, together with needed interface elements. These interconnect can be an external bus, or alternatively, when one or more of the illustrated structures are implemented together on a single VLSI chip, the interconnect can be a specialized on-chip interconnect along with an optional external bus.

1.3. System Administration Databases

The client application software of this invention, and especially its embedded browser functionality, which runs in the end-user devices, is configured according to data descriptive of the users of the system, in particular of their authorizations and access rights. In a preferred embodiment, this user-descriptive data is stored in data stores associated with the tier-2 server systems, in particular in user directory database 22 and user profile database 23. Although these databases are illustrated in FIG. 1A as being connected to object server system 18, they are preferably connected to whatever tier-2 server systems has need of the stored data. These data stores are described in this subsection.

User directory 22 preferably stores for each user authentication information, role information, access control information, general information, and so forth. Authentication information includes data used to identify a user as authorized to access the client-server system at all. This data can include user name and password, or biometric data, such as fingerprint, or so forth. Role information includes data indicative of a user's role in the institution using the client-server system. This data can indicate, for example, that a user is a physician along with speciality and seniority, or a nurse along with speciality and seniority, or a patient, or a legal guardian of a patient, and so forth. Access control information includes data indicative of a user's authority to access and update the various types of data stored through the system. For example, a system administrator is authorized to read and update the user directory and user profile databases. General user information can include such data as office or ward location, phone number, application personalization preferences, and so forth. The user directory can be implemented and accessed by commercially available directory software known in the art, such as that implementing the Lightweight Directory Access Protocol (LDAP). LDAP is a widely used protocol for accessing, for example, an X.500 directory server, a Novel directory server, a Netscape directory server, and so forth.

User profile database 23 stores information for configuring the embedded browser functionality present in the client application software of this invention. Browser functionality, especially the network access rights allowed to different users is typically decided by the administration of the client-server system in order to promote focused and productive use of the application. For example for a CPR application, physician users may be allowed unrestricted network access in order to search for medical information anywhere on the public Internet from within the context of the CPR client application. On the other hand, nurse users may be limited only to particular nursing related documents available on the group's or hospital's own intranet. Finally, patients may be even more limited to access only certain educational documents relating to their particular diagnoses. Code obfuscation or encryption techniques may be used to prevent tampering with downloaded user profile information.

Accordingly, FIG. 1A illustrates system administration graphical user interface (GUI) 25, for example provided on an administration workstation, by which a system administrator, or other designated user, enters and updates the contents of the user profile database 23 in accord with the functionality allowed to the various users. The same system administrator would typically also similarly enter and update user directory 22.

In a preferred embodiment, the user profile database includes at least the following types of information for each user. First, there is included an indication of whether the user has unrestricted or restricted network access from the embedded browser functionality. Second, if the user has restricted network access, then the user profile includes representations of all the linking information addressing of all the network resources allowed to the user. Preferably, the linking information is in the format of universal resource identifiers (URI), and the user profile then has representations of the URIs of all allowed markup language documents. Herein, "linking information" is used to identify network resource addressing information of all types and formats. Third, the user profile preferably also includes indications of which other configurable aspects of browser functionality, such as the browser controls displayed to the user, support for markup language document forms, tables, and frames, applets, document printing, cookies, multithreading, and so forth, are allowed to the user.

Although illustrated as two separate databases, in alternate implementations user directory database 22 and user profile database 23 may be stored together in a single database.

In addition to control of embedded browser functionality, a separate and independent control prevents unauthorized access of a user to the business-server objects. Requests from the client applications to the business-server objects are intercepted by access decision facility 26, which checks whether the requesting user, who has the particular access control information stored in the user directory, is authorized to access the information requested in view of the access control policies stored in access control policy database 24. If the access control policies grant access, the server is allowed to respond with the requested information to the client application. Otherwise, access is denied, and, for example, the service denial is logged to a log file for security audit purposes.

1.4. Representation of Allowed URI List

In the preferred embodiment, the user profile records for a user a representation of the URIs of all allowed network resources, such as markup language documents. The allowed URIs are selected from the typically large number of all possible URIs that can be accessed by the user. The set of all possible URIs can generally be structured as a tree, or as a forest of trees, or, generally, as a directed graph of linked URIs. Therefore, the allowed URIs are a sub-tree, a sub-forest, or a sub-graph of all possible URIs. Any representations of sub-trees, sub-forests, or sub-graphs, as appropriate, that are known and apparent to one of ordinary skill in the arts can be advantageously applied to represent all allowed URIs in the user profile database. In this subsection, a preferred such representation of all allowed URIs is described with reference to FIG. 2, which illustrates an exemplary forest of three trees of possible URIs.

Figure 2:
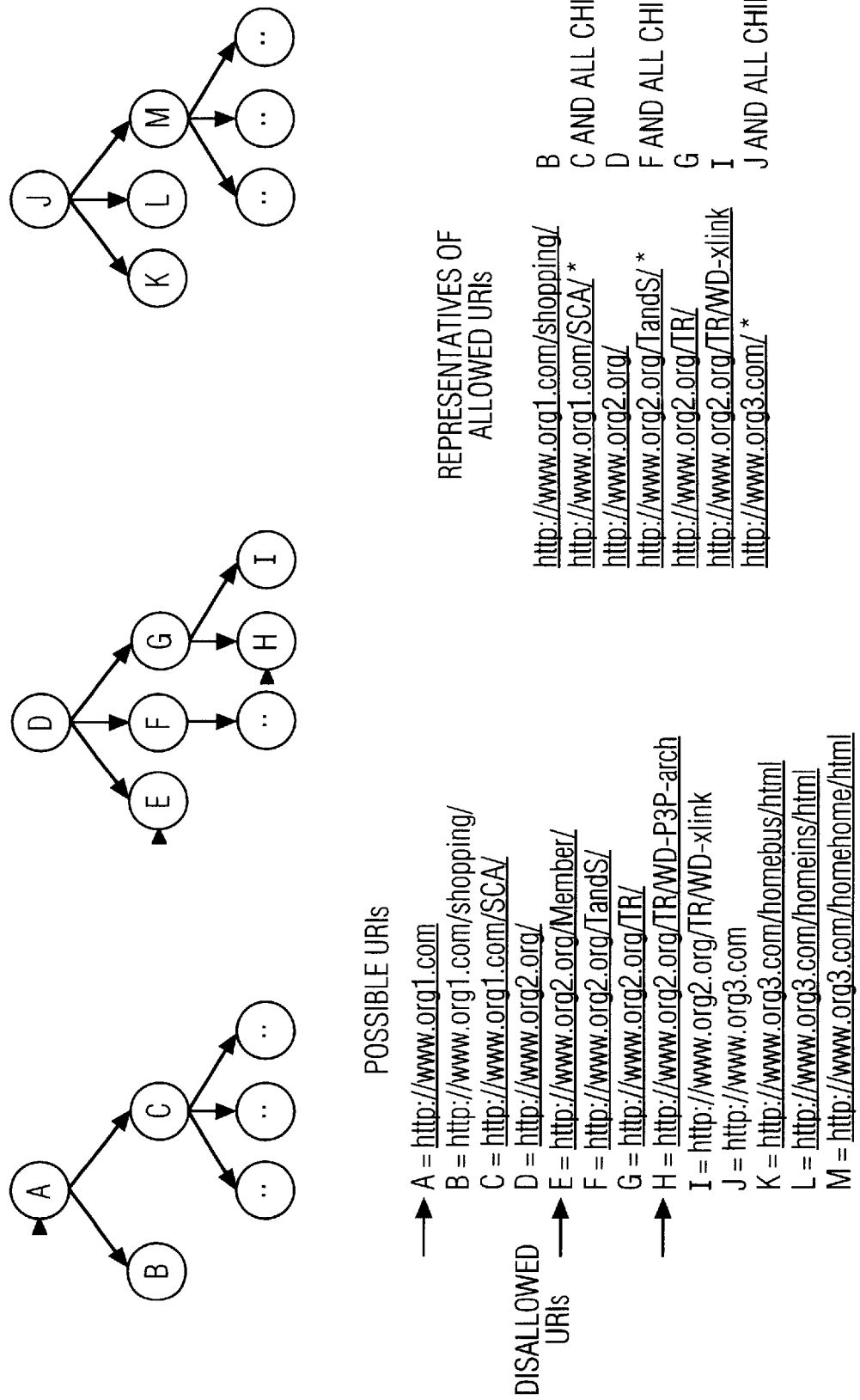
FIG. 2 illustrates an exemplary forest of representative tree-structured URIs.

In FIG. 2, nodes A, D, and J represent root URIs for the homes pages of Organization-1, Organization-2, and Organization-3, respectively. Children of a parent node extend the parent URI by one additional relative address. For example, child node G extends the URI of parent node D with the additional relative address of "TR/". Likewise, child node I extends the URI of parent node G with the additional relative address of WD-xlink. The list of all possible URIs is illustrated on the left in FIG. 2. Of these, this particular user is authorized to access all URIs except those for the nodes A, E, and H, which are indicated by arrow in the illustrated list and by arrowheads in the tree diagrams.

A preferred representation of the allowed URIs for storage in this user's profile is illustrated on the right in FIG. 2. In this representation, all URIs are the respective absolute addresses of allowed nodes. A URI followed the character "*" indicates that both the node having this URI address and all its child nodes are allowed. Nodes C, F and J are examples of allowed nodes for which all child nodes are allowed, and which accordingly have a "*" after their address in the allowed list. This representation is considerably more compact than the alternative in which the URI of every allowed node is individually listed. Note that it is possible to limit the granularity of allowed content. For example, in FIG. 2, although the home page for Organization-1, node A, is not allowed, children of the home page are allowed.

In an alternative representation, the URIs listed are the absolute addresses of nodes that are not allowed. Here also, a special character can be used to indicate that a node and all its child nodes are not allowed. This alternative representation is preferable in the case where a user is allowed to access most resources, only a few resources not being allowed. Such a case may occur, for example, if it desired to filter offensive or inappropriate information from appearing in the context of the client application program.

Both representations may be combined in a single user profile database by including an indication of which representation applies to a particular user or to a particular group of URIs in the list for a particular user. The subsequently described markup document filtering methods work with either representation.

1.5. Absolute and Relative URIs

Since absolute and relative URIs are commonly used in the linking information present in markup language documents, the following is a brief description the two types of URIs. Generally, an absolute URI is a full and complete address for identifying a document or resource in a network, such as an intranet or the public Internet. A relative URI is only a part of an address which extends a given absolute address with additional qualifications.

First, in the case of the HTML markup language, specifically in version 3.2, consider an exemplary home page for Organization-2 having the URI of http://www.org2.org/. Suppose that another directory, TR/, holds all technical reports of Organization-2. Then, with HTML 3.2 a relative link from the home page to the TR/directory can be represented by the following linking information:

<a href="TR/">Technical Reports</a>

When a user activates this linking information, represented by the words "Technical Reports" displayed on the home-page with characteristic formatting, the linking information is resolved to the absolute URI address, namely http://www.w3.org/TR/. This resolution is accomplished by concatenating the contents of the relative linking information to the absolute address of the document displaying the relative linking information.

The HTML 3.2 anchor tag also allows a link to point to specific sections, or locations, within a document. These sections or locations are known as document fragments. For example suppose the file home.html at URI address http://www.org2.org/home.html has five sections, and a link specifically to Section 4, and not to the start, or top, of home.html is desired. First, Section 4 is specifically identified in the document by placing an anchor at the start Section 4 with, for example, the following syntax:

<a NAME="section4"><h2>Section 4</h2></a>

Herein, "#section4" is called a fragment identifier. Then, Section 4 in home.html can be specifically and directly addressed in another document with the absolute URI including the fragment identifier:

http://www.org2.org/home.html#section4

In the home.html document, Section 4 can be specifically and directly addressed with the following relative URI including the fragment identifier:

Click here <a href="home.html#section4">Section4</a> to go to Section4.

With these links, a user does not need to scroll from the start of home.html to get to Section 4.

The methods of this invention do not distinguish between fragments of the same document, because, a reference to the start of a document or to any of its fragments causes download of the complete document. Therefore, a user can scroll to any other part of that document following access of a link to any fragment of that document. Thus, when an absolute URI is resolved from a relative URI in linking information found, fragment identifiers (e.g., #section4) are deleted, or ignored, before comparison to the allowed URI list. If the comparison shows that the URI is allowed, then the fragment identifier part in the filtered documents is used to access the desired location within the document.

Accordingly, the allowed URI list need not maintain representation of allowed fragment identifiers. In other words, access granularity according to this invention is at the level of the document.

The XML markup language also uses absolute and relative linking information, including absolute and relative URIs. XPointer defined elements can also be used in conjunction with the URI structure, as fragment identifiers or queries, to specify a more precise location inside a document.

2. Browser Functionality

This invention provides in a client application context and within the client application window a browser sub-window with browser functionality configurable in response to user profile parameters. Relevant user profile parameters are obtained for the client application when the user is first authenticated for client-server system access. In particular, the allowed URIs that can be accessed by a user are controlled by the user profile parameters. The client application interface itself is also preferably personalized according to the preferences and assignments of each user.

The browser sub-window inside the application window preferably has a basic subset of the browser functionalities present in a standard markup language document browser program. For example, it is advantageous that at least basic navigation functions, represented by icons such as back, forward, reload, stop, and home, are allowed for all users. Basic search and bookmark functionality is also preferable. However, other features of browsers are preferably enabled or disabled for different categories of users. These configurable features include support for markup language forms, tables, applets, frames, and so forth, document printing, server cookies, task multithreading, and so forth. Generally, browser functionality can be configured in several manners in order to meet the requirements of several categories of users.

Importantly, the browser functionality of this invention also has support for limiting allowed linking information, or URIs, that can be accessed by a user. The browser functionality achieves this limitation by preventing a user from ever sending a request to a HTTP server that is not allowed. In a preferred embodiment, the browser functionality both removes any editable field for entry of URIs to be accessed, and also removes unauthorized linking information from markup language documents before their display. To remove unauthorized linking information before display, all markup language documents are intercepted, their contents parsed, and the parsed contents filtered to find and delete linking information that is indicated as not allowed in the user profile.

For example, in the exemplary CPR system, a physician has relatively unrestricted network access, and the browser sub-window presents both an editable location entry field and bypasses filtering of markup language documents. On the other hand, a patient has relatively restricted access, and any location field is either removed or made not editable for entry of URIs, and linking information in markup language documents is filtered in view of the user profile.

In the following subsections, details of the application interface and its use are presented, first, for the case of unrestricted network access, and, second, for the case of restricted network access. The last subsection presents a preferred implementation of the application program and embedded browser functionality.

2.1. Unrestricted Browser Interface

The graphical user interface (GUI) of a client application with embedded browser functionality of this invention can take a wide variety of layouts and arrangement, each adapted to the needs of the particular client application and the preferences of users. In a preferred embodiment independent of the layout and arrangement, the client application typically displays, according to a windowing paradigm, application specific data and application specific control, and also, when the browser functionality is activated, also browser specific data and browser specific controls. Application specific data is, of course, the substantive data relevant to the application, for example, medical records information for the exemplary CPR application. Application specific controls provide facilities for controlling application functioning, and, also in the preferred embodiment, include display regions selectable with a pointing device or a keyboard in order to activate particular application functions. Such display regions can include menu bars, tool bars, icons, buttons, dialog boxes, and so forth as known to one of ordinary skill in the art. Browser specific data typically includes markup language documents formatted and displayed according to their included markup instructions. Browser specific control are, similar to the application specific controls, activated in order to control browser functioning.

The display of these controls and data can be laid out and arranged in many manners in different windowing paradigms. In preferred embodiments, the application specific controls and data will be spatially separated and displayed in a main application window. The browser specific controls and data will be similarly spatially separated in a browser sub-window. These various display elements can be resized, rearranged, temporarily hidden, and so forth; windows can be tiled, cascaded, overlapped, minimized, maximized, and so forth; all as is known in the art. This invention encompasses all these well-known windowing layouts and arraignments.

Figure 3:
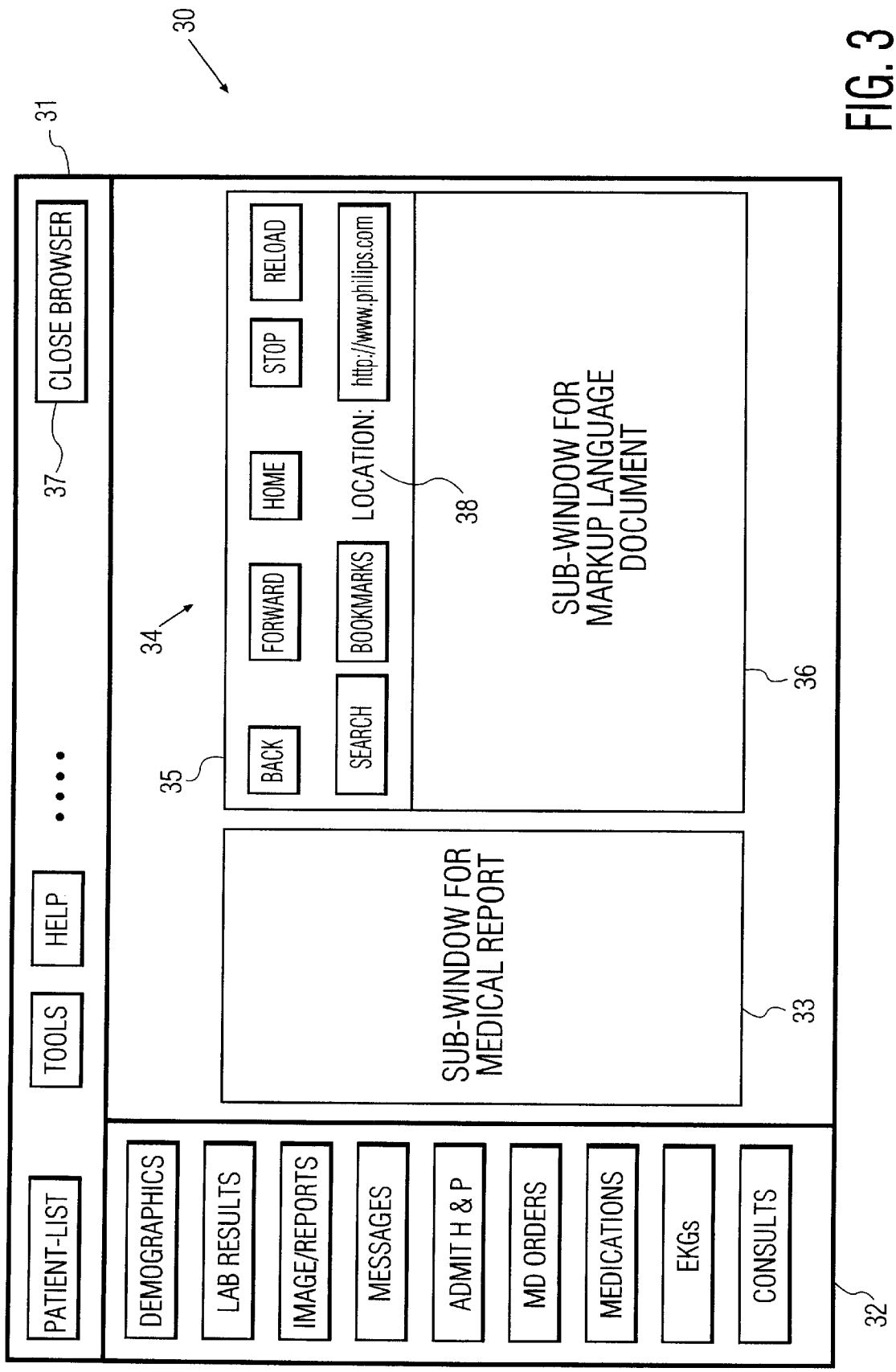
FIG. 3 illustrates a graphical interface of an application with embedded browser functionality presented to a user of a certain higher authority according to this invention.

Without limitation, FIG. 3 illustrates one exemplary layout and arrangement of the GUI of this invention appropriate for simultaneous display of the display elements of the preferred GUI. In this figure, window 30 is the client application main window configured for a less restricted user, such as a physician. Horizontal toolbar 31 preferably displays application specific controls that are generic to most application sub-functions. Illustrated in this toolbar are, for example, controls for Patient-List display, Tools selection, Help request, and browser toggle 37. The Browser toggle control activates and deactivates the embedded browser functionality. Vertical toolbar 32 preferably displays further application specific controls that are specific to a current application sub-function. Illustrated here are controls requesting various sections of the CPR of a patient already selected from a previously displayed patient list. Contents of the requested CPR sections, the application specific data in this example, are then displayed in report 33, which preferably can be adjusted in size.

In FIG. 3, the browser functionality is activated and browser sub-window 34 is intermediately sized within the application window. The browser sub-window includes toolbar 35, displaying browser specific controls, and sub-window 36, displaying browser specific data, namely a retrieved markup language document. Because the physician user here has unrestricted network access, the browser specific controls include editable location entry field 38 for the free entry of URIs to access.

This windowing interface is accessed according to the following steps, which result in the information display illustrated in FIG. 3.

1. (login) Upon first invoking the CPR application program at an end-user device, a login screen appears where the user enters authenticating information, for example a user ID and password, or presents biometric information, such as a scanned fingerprint.
2. (authentication) The application then authenticates the user and the user's access rights by, for example, invoking authentication methods on tier 2 servers which access information in the user directory and compare it to entered authenticating information. After authentication, user profile records are loaded to the memory of the end-user device.

3. (application interaction) The application then displays application window 30 configured according to directions in the loaded user profile records and the user commences application interaction with the application specific controls. For example, the user then obtains a patient list by activating the Patient-List control, selects a patient from the list, and then selects a section of CPR of that patient by activating the desired report control. The contents of the desired section are then displayed in report sub-window 33.

4. (browser activation) When network access is needed in the context of the client application, the user starts the embedded browser functionality by activating browser toggle control 37. For example, this control displays "Open Browser" when the browser is inactive, and "Close Browser" when active.

5. (browser interaction) The activated browser functionality displays resizeable browser sub-window 34, including browser specific controls 35 and sub-window 36 for browser specific data. Because the user profile records indicate unrestricted access, the browser specific controls include editable location entry field 38, and the markup language documents displayed in sub-window 36, for example, a document initially displayed, are not filtered, having intact linking information. Accordingly, the user can interact with the application browser functionality in a substantially standard manner by entering URI address in location field 38, or activating linking information in displayed documents.

6. (logoff) When finished, the user logs out of the application, which closes application main window 30.

2.2. Restricted Browser Interface

Importantly, according to the present invention, the specific controls and data are actually displayed in the application window in a manner responsive to a user's authorities and preferences indicated that user's profile records. For example, access to certain application functions can be prevented for unauthorized users by not displaying the controls by which they can be activated. Browser functionality is similarly configured in a preferred embodiment according to a user's indicated authorizations by displaying only controls for those functions for which that user is authorized. If a user's network access is restricted, the browser sub-window does not display an editable location entry field and unauthorized linking information is filtered from markup language documents before display.

Figure 4:
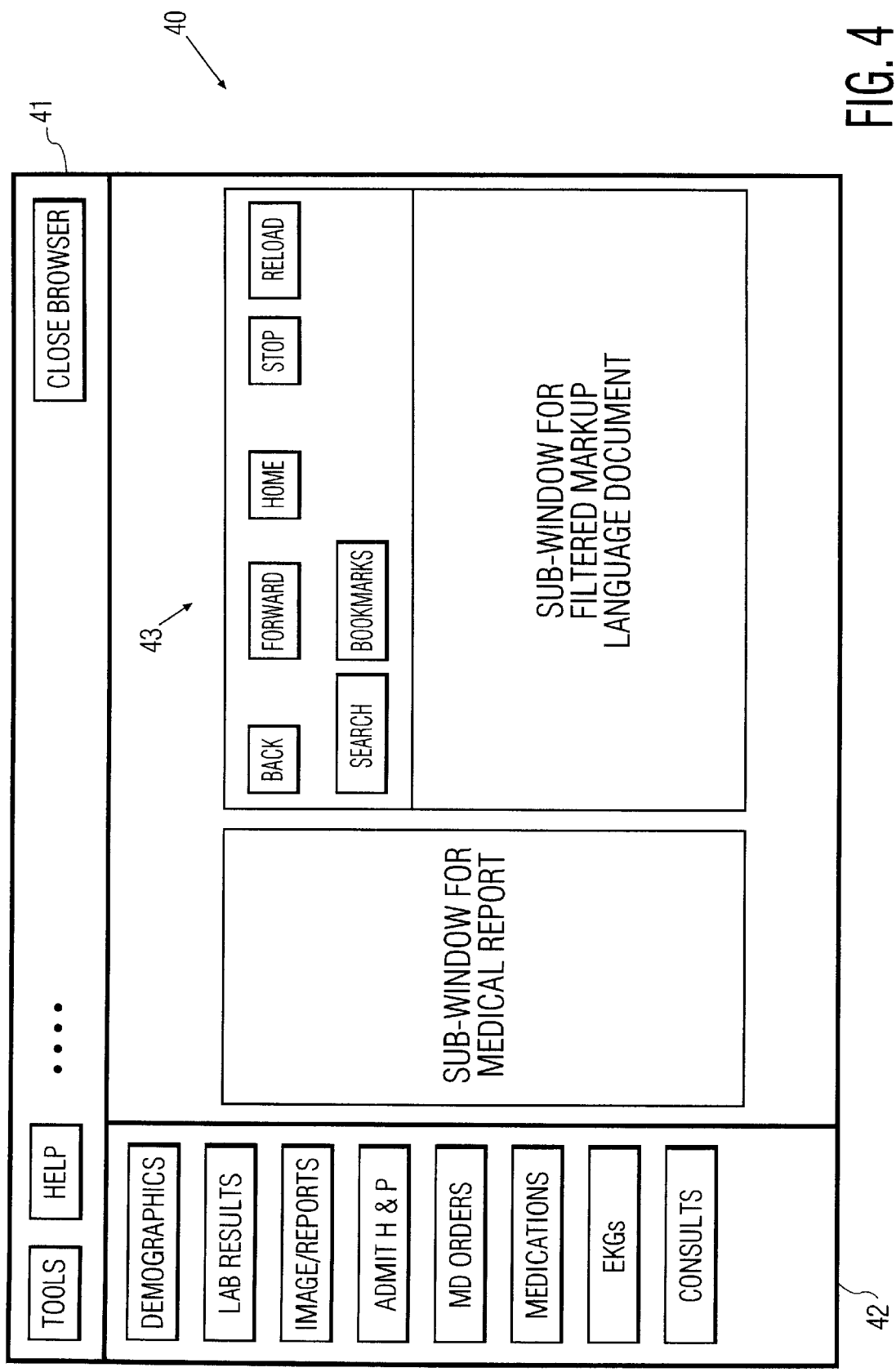
FIG. 4 illustrates a graphical interface of an application with embedded browser functionality presented to a user of a different lower authority according to this invention.

For the exemplary CPR application, FIG. 4 illustrates exemplary application main window 40, which is similar to main window 30 of FIG. 3 except that it is configured for a user of more restricted authority and access, such as a patient. This window, like that in FIG. 3, is not limiting, but is exemplary of one layout and arrangement of the GUI of the preferred embodiment of this invention. In FIG. 4, in contrast with application window 30 of FIG. 3, generic application toolbar 41 does not display the Patient-List control, since a patient is permitted to view only that patient's CPR. Also, CPR-display sub-function toolbar 42 does not display the Message control, since messages between care providers are considered to be private.

The network access of this user being also indicated as restricted in the user's profile records, accordingly, a location field is not present in the browser specific control toolbar included in browser sub-window 43. Alternately, a current location field may be displayed that is disabled for entry of linking information. Also since markup language documents are filtered before display, only allowed linking information, as indicated in the user profile, is displayed for user activation in markup language documents.

The steps for accessing the user interface and displayed information illustrated in FIG. 4 are the similar as those described with reference to FIG. 3, namely the steps of login, authentication, application interaction, browser activation, browser interaction, and logoff. Any differences are clear limitations due to the greater access restrictions placed on this user.

2.2.1 Home Page for Restricted Users

In an alternative embodiment, network access for restricted users makes explicit use of the allowed URIs represented in the user profile records. In one such alternative, the browser presents specific controls enabling user selection of any allowed URIs. Such specific controls can be a drop-down selection list structured either as hierarchical tree-structured bookmarks representing the allowed URIs, or more simply menus listing all allowed URIs for selection. In another alternative, the browser dynamically creates and displays, either upon initial activation or upon user request, a personalized markup language document, a user "home page", which includes linking information representing all allowed URIs, so that the user may access a resource by activating its linking information. This home page can be formatted according to either HTML or XML syntax.

In this alternative embodiment, both the URI itself along with text descriptive of the addressed resource can be presented to the user. Preferably, the descriptive text is the title of the addressed document. A "crawler" program, as known in the art, can periodically access each allowed URI address on the network to retrieve the document title, or other descriptive text, and to store it along with the allowed URI. Additionally, the crawler program can also check if allowed URIs are current and reachable.

This alternative is further described with reference to FIG. 2. If the user's only allowed URIs are those for node J and all its children, a dynamically created home page need only display linking information representative of the URI http://www.org3.com, along with optional descriptive text. If the user can access all the allowed nodes of FIG. 2, then the list of allowed URIs has seven parent URI entries, and a dynamically created home page includes linking information representative of these seven URIs, along with optional descriptive text.

The browser functionality of the application is modified to include instructions to access the profile of a restricted user and its stored allowed URI list to dynamically create such a home page or browser specific controls.

2.3. Application/Browser Implementation

The application, and its browser functionality, are implemented with encoding instructions and data placed in end-user device memory that together cause the end-user device processor, and the other end-user device components, to function according to this invention. Such instructions and data resident in an end-user device are generally the means by which the methods and actions of the present invention are accomplished. In particular, the necessary data relevant to this invention derives from the content of the user profile records and, additionally, of the user dictionary records. This content specifies user personalization, authorizations, allowed URIs, and so forth. The necessary instructions include instructions encoding application function which format application specific controls in a manner responsive to the user profile data as described. They further include instructions encoding browser functionality responsive, in the manners described, to the content of the user profile records.

The application instruction can first be implemented in any convenient programming language and then extended with the browser functionality of this invention in standard manners known to one of skill in the art. Preferred languages are object oriented in order that server objects, present in the preferred client-server architecture described, can be directly invoked. More preferred is use of the Java language, so that the resulting instructions are platform independent and executable in any Java-compatible environments, such as operating systems or markup language browsers with Java virtual machines. Such Java coded applications can be installed either as a standalone application or downloaded as an applet specified in a markup language document.

In particular, the graphical user interface components of the application and its embedded browser functionality can be preferably specified with the Swing component set of the Java Foundation Classes (JFC) from Sun Microsystems. The Swing component set assists in specifying such windowing components as menus, tool bars, dialogs, and so forth, and extends the basic Abstract Windows Toolkit (AWT) of Java. This component set provides classes and application programming interfaces (API), for example, an HTML Editor Kit, the JEditorPane class, the JPanel class, and so forth, that can be directly used to implement the described browser functionality. See, e.g., The Swing Connection, http://www.javasoft.com/products/jfc/tsc/index.html).

Additionally, software components already providing complete portions of standard browser functionality can be imported into a client application and modified according to the present invention. For example, Sun's JavaHelp components use the Swing and other Java libraries to parse and display HTML 3.2 help documents. See, e.g., JavaHelp; a New Standard for Application Help and Online Documentation, http://www.javasoft.com/products/javahelp/). ICEsoft's ICE Browser Java component can be embedded in applications to provide standard browsing functions in an application sub-window. These standard functions can then be extended and modified to provide the browser functionality of this invention. See, e.g., ICEsoft A/S, Bergen Norway, http://www.icesoft.no/products.html). Alternatively, the HotJava browser bean can be embedded and similarly modified and extended. This is a less preferable alternative because HotJava has a large initial size which would grow with needed modifications.

Optionally, people with special needs can be accommodated with accessibility extensions to the browser functionality which are advantageously based on Sun Microsystems' Accessibility API (Accessibility: Support for People with Disabilities, http://www.javasoft.com/products/jfc/index.html#access). This API provides an interface by which technologies for meeting special needs can interact and communicate with Swing and Abstract Windows Toolkit (AWT) components. This API provides the necessary support for accessibility technologies to locate and query user interface objects inside a Java application running in a Java virtual machine. Thus, it is possible to design the embedded browser functionality so that it interfaces with a speech recognition engine. The browser can also use the Accessibility API to interface with screen readers.

3. Filtering Markup Language Documents

As set forth above, restricting user network access to only allowed URIs is achieved, in part, by filtering linking information that is not indicated as allowed in the user profile from displayed markup language documents. In this section filtering methods for HTML and XML documents are described. The type of a markup language document can be easily determined from document type declarations in its header information. These filtering algorithms are preferably implemented to be tolerant of common markup language syntax errors including, at least, missing end tags.

These algorithms involve parsing and string matching, and are advantageously implemented as separate modules in languages specialized for performing string matching, such as sed or perl.

Alternatively, they can be implemented integrally with the browser functionality, preferably in Java.

3.1. Filtering HTML Documents

Figure 5:
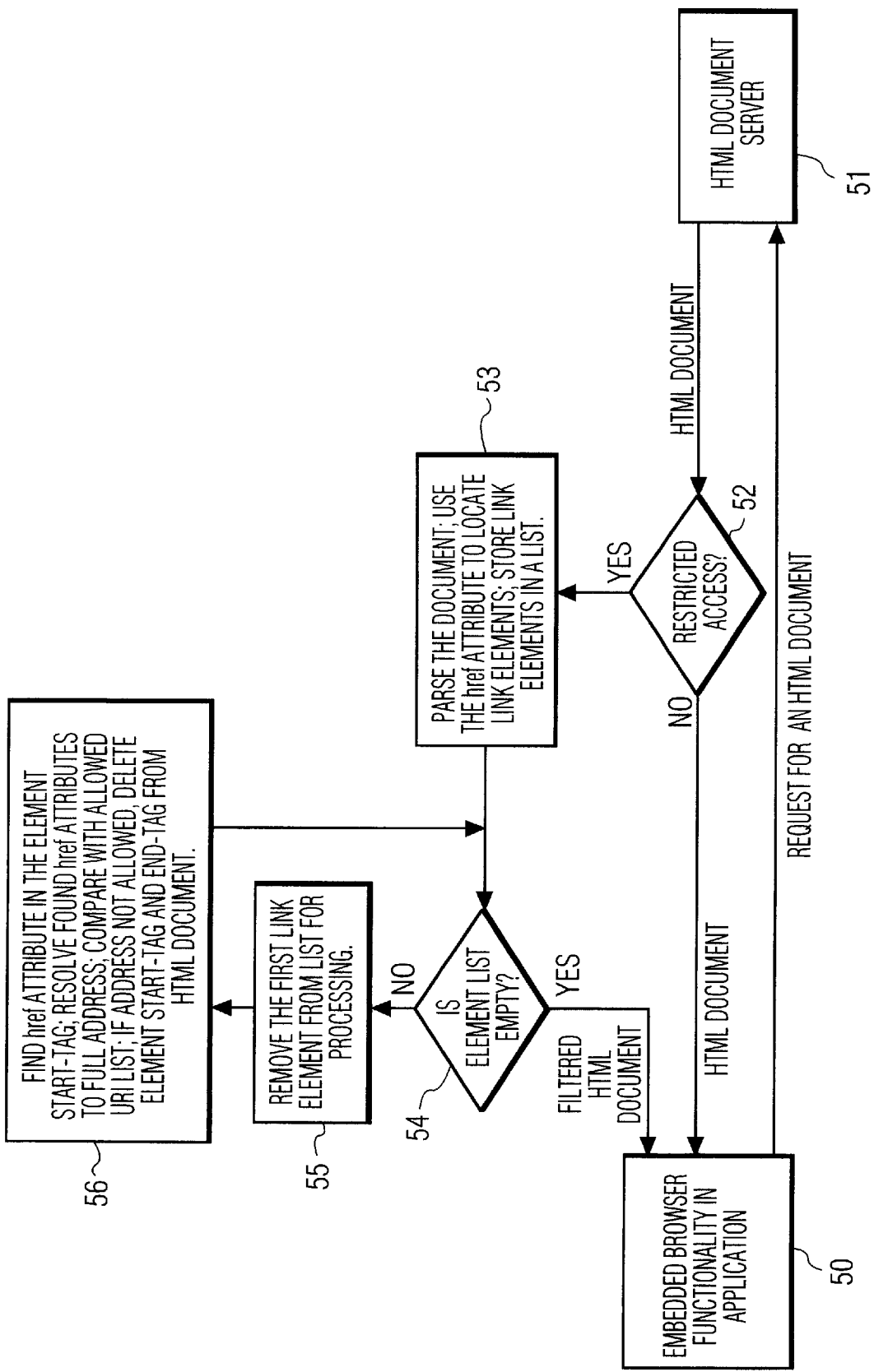
FIG. 5 illustrates a method for filtering an HTML document by deleting linking information that is not allowed.

FIG. 5 illustrates the preferred method for filtering HTML documents. This invention also encompasses alternatives apparent to those of skill in the art in view of this figure and its accompanying description.

First, embedded browser functionality 50 requests an HTML document from allowed HTML server 51. Upon return of the requested document, the contents of the user profile are checked at step 52 to determine if the user has unrestricted network access. If so, filtering is bypassed for the returned HTML document. If not, the users network access is restricted, and the returned document is filtered to delete linking information that is not allowed.

Step 53, the first step in HTML document filtering, parses the returned document in order to locate all linking information, or linking elements. These elements are simply identified as those whose start-tag contains an href attribute identifying an addressed resource, such as a markup language document or part of a markup language document. Accordingly, this steps searches for all occurrences of the href attribute, which are recognized by the letters "href", followed by zero or more spaces, followed by the "=" character, followed by zero or more spaces, and finally followed by the '"' character. All linking elements found are stored in a list for subsequent processing.

Each link element found and stored in the list is selected for processing at step 55 until the list is found to be empty at step 54. When the list is empty, filtering is complete and the markup language document is returned for further processing by embedded browser functionality 50.

Step 56 processes each link element. First, as previously described, each href attribute value is resolved to an absolute address, if the address is initially relative, by using the known absolute address of the current page in which the link element was found. Next, the representation of the allowed URIs from the user profile is searched for this resolved absolute address. The search ignores any fragment identifier part that may be present in the resolved absolute address. If no allowed URI in the list matches the absolute address, then the link is not allowed, and it is filtered out by deleting the start-tag and the corresponding end-tag of the element containing the href attribute from the HTML document. Examples of deleting links that are not allowed are presented in Appendix A.

Parsing and string matching are performed in a case-independent manner since URIs and HTML tags are case-insensitive.

3.2. XLink Overview

Before describing the method of filtering XML documents, a brief summary of XML linking information, as defined by the XLink specification, is provided. One of skill in art will immediately appreciate how to adapt the methods presented to any future changes to the XLink specification.

XLink linking elements are identified by the presence of the reserved xml:link attribute. Each linking element has one or more associated locators that identify the addresses of the remote resources participating in the link. In a locator the href attribute identifies the address of a resource, either as an absolute URI, or as relative address, i.e., a fragment identifier (XPointer) relative to an absolute address, or both.

XML linking elements are either inline or out-of-line, and also either simple or extended. In an inline link, the content of the linking element includes the associated locator serving to identify the address of the participating resource. A simple inline link has only one locator and combines into a single element the functions of a linking element, a locator, and a descriptor of resource attributes. The HTML anchor element, <a . . . >, is an example of a simple inline link. Another example of an inline simple link is shown below:

<P>The headquarters of <mySimpleLink xml:link="simple"
   inline="true" href="http://www.org3.com">organization-3</
   mySimpleLink> are moving to Amsterdam.</P>

Here, mySimpleLink is a user-defined simple linking element. Inline links can also be extended, containing multiple locators addressing multiple resources.

An out-of-line link, in contrast, does not itself identify the link's addressed resources, instead requiring one or more associated, but separate, child, or dependent, addressing elements that specify the addresses of linked resources. An extended out-of-line link addresses many resources, separating the identification of a link from the identification of the addressed resources. The following is an example of an extended out-of-line link:

<myExtendedLink xml:link="extended" inline="false">

<locator href="products.xml"/>

<locator href="service.xml"/>

<locator href="http://www.org4.com"/>

</myExtendedLink>

Here, myExtendedLink is a user-defined extended out-of-line linking element addressing three resources, two expressed relative to the document in which the linking element is contained and the third expressed as an absolute address. One way that an extended out-of-line link can be used is that the user is provided with a menu list of links (for example, three in the example above) and can choose which one to go to. Simple out-of-line links addressing only one linked resource are also possible.

Dependent addressing elements can be "locator" elements, as in the above example. Dependent addressing elements can also be a "group" of "document" elements, forming together an interlinked group. The "group" elements marking an extended link group which is a collection of "document" elements that contain links to other documents, Each linked document in the group is identified by a associated "document" element. "Document" elements therefore also have href attributes specifying the addresses of linked resources.

3.3. Filtering XML Documents

Figure 6:
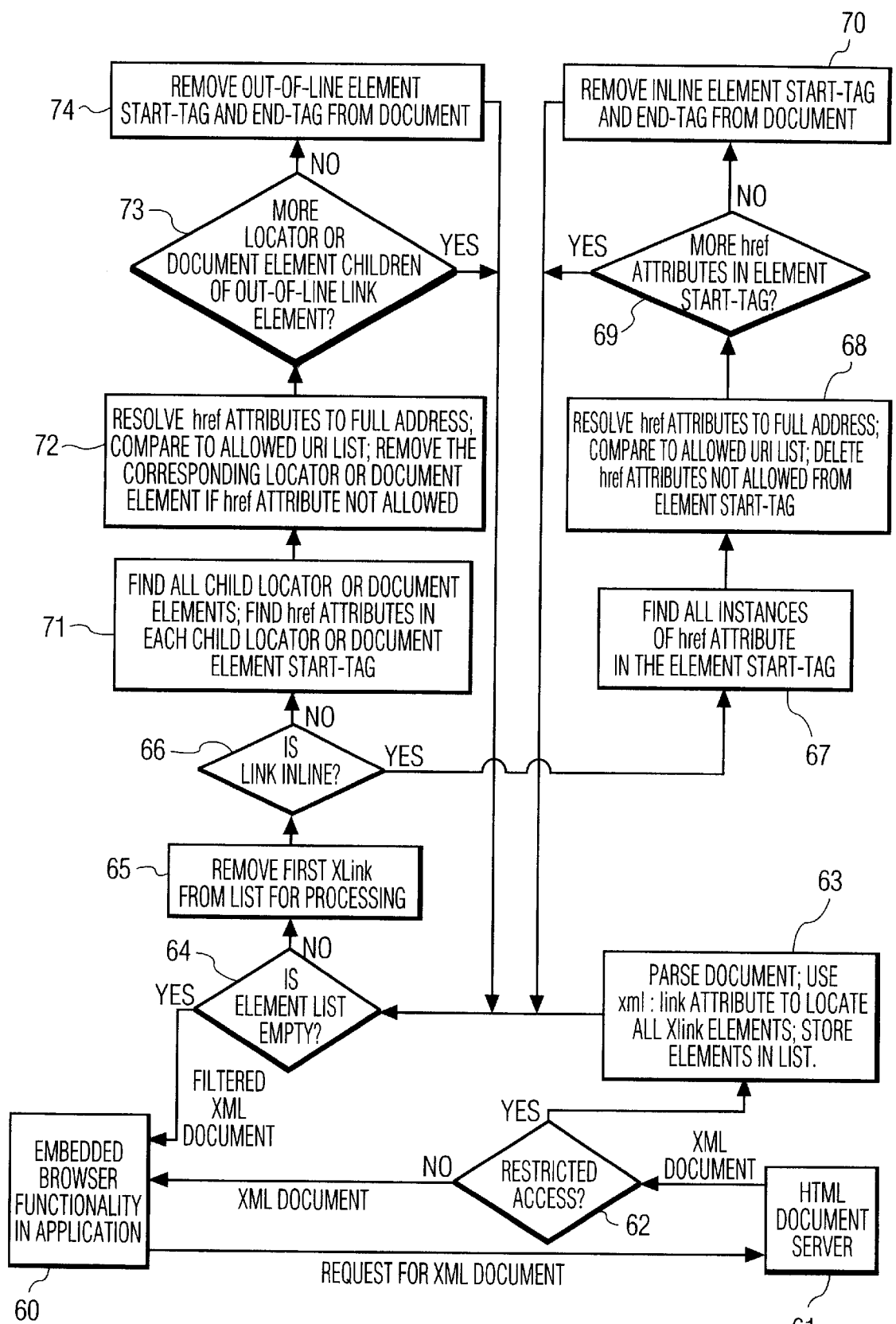
FIG. 6 illustrates a method for filtering an XML document by deleting linking information that is not allowed.

FIG. 6 illustrates the preferred method for filtering XML documents. HTML and XML documents can be distinguished by the document type declaration appearing at the beginning of each markup language document. This invention also encompasses alternatives apparent to those of skill in the art in view of this figure and its accompanying description.

First, embedded browser functionality 60 requests an XML document from allowed XML server 61. Upon return of the requested document, the contents of the user profile are checked at step 62 to determine it the user has unrestricted network access. If so, filtering is bypassed for the returned XML document. If not, the user's network access is restricted, and the returned document is filtered to delete linking information that is not allowed.

Step 63, the first step in HTML document filtering, parses the returned document in order to locate all linking information, or linking elements, and to store them in a list for subsequent processing. Linking elements are indicated by the xml:link attribute. This attribute may be explicitly present in a linking element start-tag, as illustrated in the above examples, or it may be indirectly indicated as a default value in an attribute-list declaration of a linking element. For example, the attribute-list declarations <!ATTLIST mylink xml:link CDATA #FIXED "simple"> declares that all "mylink" elements in the current XML document are simple linking elements. Accordingly, all attribute-list declarations as well as element start-tags are parsed in order to recognize all linking elements.

Each linking element found and stored in the list is selected for processing at step 65 until the list is found to be empty at step 64. When the list is empty, filtering is complete and the markup language document is returned for further processing by browser functionality 60.

Next, step 66 checks the inline attribute of each linking element to determine if the linking element is inline or out-of-line. The default value for the inline attribute is true. For inline linking elements, step 67 finds, for simple inline links, the href attribute present, or, for extended inline links, the href attributes present. For each found href attribute, step 68 resolves, if necessary, the address indicated in the href attribute to an absolute URI address, searches the representation of the allowed URIs for the indicated absolute address (minus any fragment identifier XPointer part), and deletes the href attribute from the element start tag if it is not allowed. Steps 69 and 70 delete the linking element start tag and corresponding end tag from the document if all the contained href elements are not allowed and have been deleted from the start tag.

Processing out-of-line linking elements is similar except that all child, or dependent, addressing elements which specify the addresses of linked resources must first be found. Accordingly, step 71 finds all such locator, group, and document elements. For locator elements, step 72 finds its href attribute, resolves this attribute to the absolute address if necessary, checks the list of allowed URIs for the resolved absolute address, and deletes the locator element if the href attribute is not in the allowed URI list. Step 73 and 74 delete the out-of-line linking element's start tag and corresponding end tag from the document if no locator elements remain in the start tag.

The processing of group and document addressing elements is similar. Accordingly, step 71 finds all such locator and document elements and notes the value of their href attribute. For locator elements step 72 resolves the href attribute to the absolute address if necessary, checks the list of allowed URIs for the resolved absolute address (minus any fragment identifier part), and deletes the corresponding locator element if the href attribute is not in the allowed URI list. Step 73 and 74 delete the out-of-line linking element's start tag and corresponding end tag from the document if no child locator elements remain for the out-of-line element.

The processing of extended link groups is similar. Group elements are found in step 63 by checking for xml:link attribute values of "group". Step 71 finds all document elements of the extended link group and notes the value of their href attribute. For document elements step 72 resolves the href attribute to the absolute address if necessary, checks the list of allowed URIs for the resolved absolute address (minus any fragment identifier part), and deletes the corresponding document element if the href attribute is not in the allowed URI list. Step 73 and 74 delete the group element's start tag and corresponding end tag if no child document elements remain for the extended link group element.

3.4. Extension to Other Domains

The filtering methods described in this section, and this invention generally, are not limited to only HTML and XML documents with linking information formatted as URIs, but can be generally applied to any markup language documents with a syntax providing identifiable markup elements serving as linking elements indicating network addresses of accessible resources. One of skill in the art, in view of the previous description, will appreciate how to store lists of linking information in other formats, possibly compressed if appropriate, and how to modify the parsing steps in the described filtering methods to recognize linking element defined by other markup languages.

In particular, these methods can be applied to markup languages being developed by the Advanced Television Systems Committee (ATSC) for the consumer electronics industry. See, e.g., Broadcast HTML Specification, http://toocan.philabs.research.philips.com/misc/atcs/bhtml; Wugofski, 1998, a Modular Hypertext Markup Language for Broadcast Applications, Draft no. 4, Over the Moon Productions/Gateway. The ATSC is in the process of developing application programming interfaces for a Digital Television Application Software Environment (DASE) compliant receiver, including markup languages which are similar to HTML.

For example, xHTML specifies a collection of document type definition (DTD) sets that can be combined to specify xHTML-based platforms, such as the w3HTML, bHTML, and cHTML platforms. The w3HTML platform provides support for full World Wide Web (WWW) connectivity. The cHTML platform provides a compact profile for appliance-oriented products. The bHTML platform provides a profile for TV-centric products written in XML, including HTML elements and attributes, and including new synchronization functionality as new elements, attributes, and style properties.

All these markup languages define linking elements with an href attribute indicating a URI specifying the address of a network resource. These linking elements define links between a current element in a current document and the destination anchor in a destination document.

In addition to accommodating the TV-type appliance applications above, the methods of this invention can also be generally applied in other consumer appliances. Generally, it is anticipated that browser functionality will become available in standard consumer produces, for example, microwave ovens and other kitchen appliances, pagers and other specialized information appliances, and so forth. These appliances will be able to connect to Internet servers for product upgrades, feature upgrades, bug fixes, and so forth. This embedded browser functionality can advantageously use the methods and apparatus of this invention, along with a permanently stored list of allowed URIs, to limit Internet access of the consumer appliances to the specified portal servers, problem fix servers, upgrade servers, or so forth. Accordingly, these specific servers can be accessed for their specific functions by a single button and with no consumer skill required.

4. Running an Applet Versus an Application

If the application, as well as its embedded browser functionality, is coded in the Java language, it can be installed in an end-user device either as a standalone application or as an applet downloaded and executed inside most commercially available markup language browser programs. Installation as an applet, instead of an application, is advantageous in that the applet can be upgraded by merely placing a new version on a server machine, whereas application upgrade requires placing the new version on every end-user device. Further, applets provide easy installation for most end-user devices because browser programs are, or will be, widely available for almost all end-user devices. Applets do have the disadvantage of requiring download time.

Use of a Java runtime plug-in permits a standard Java virtual machine environment for applets across the range of commercial markup language browsers. Such plug-in technology is available from Sun Microsystems' (Java Plug-In, http://www.javasoft.com/products/plugin/). Further, applets can be marked as "signed" so that they are trusted to access local files and to open connections to network servers other than the one from which they were downloaded. Additionally security can be provided by local configuration code, which checks policy files, and, if appropriate, authorizes individual applet access to files or network addresses.

Figure 7:
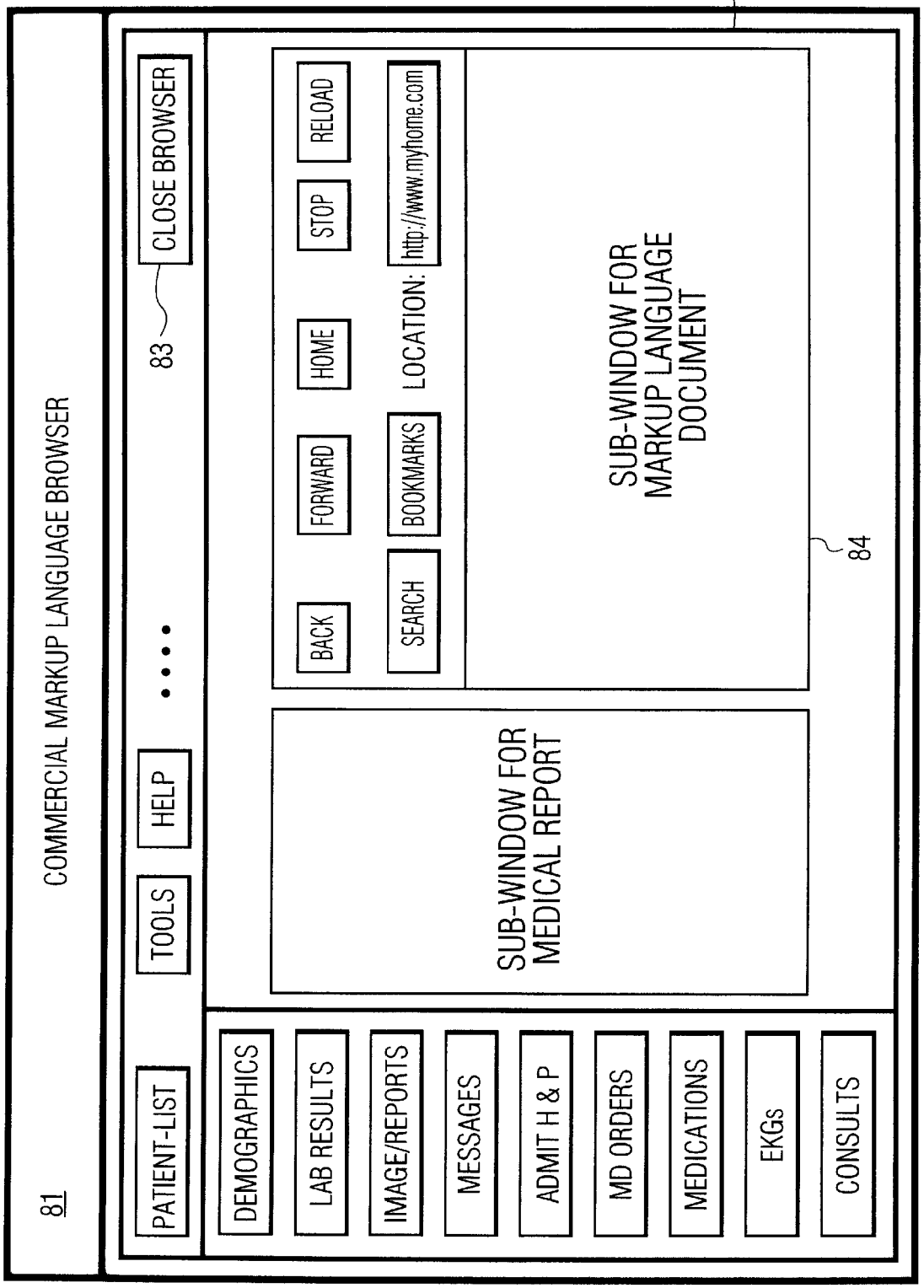
FIG. 7 illustrates a graphical interface of a signed applet or a policy-based authorized applet with an embedded browser running inside a commercial browser program.

FIG. 7 illustrates an exemplary and non-limiting arrangement and layout of the graphical user interface of this invention as presented by a signed applet being run by a commercial markup language browser. Here, window 80 is the commercial browser's standard window with its own toolbar 81. Inside this window, sub-window 82 presents the display generated by the applet of this invention. Here, similarly to FIG. 3, this is illustrated as the display for a less restricted physician-type user. Of course, for a more restricted patient-type user the display would be more similar to FIG. 4. Browser toggle control 83 on the top right-hand corner of the applet sub-window activates or deactivates the browser functionality embedded in the applet application. Accordingly, browser sub-window 84 is in effect a browser in a browser.

Use of an applet differs from use of an application only in that the user initially starts a commercial browser available on the end-user device and directs it to the URI of the HTML page referencing the signed Java applet. Such an applet reference is identified with an applet tag having a code attribute identifying the name of the applet class filename, and an optional "archive" attribute identifying a jar file in which the class is archived.

Appendix A

This appendix presents examples of deleting HTML links that are not allowed. In HTML 3.2 the anchor tag <a . . . > and the area tag <area . . . > are usually used with href attributes to specify linking information. For example, consider the following simple HTML source segment that uses the anchor tag:

<P>The headquarters of <a href="http:
//www.org3.com">Organization-3</a> are moving to Amsterdam.</P>

A markup language browser will typically display this as:

The headquarters of <u>Organization- 3</u> are moving to Amsterdam.

Clicking on the underlined word will direct the browser to download the document at the address http:// www.org3.com. If this document is not allowed for a user, the HTML filtering methods, upon parsing the document, detect the start-tag containing the linking information 'href="http://www.org3.com"' and the corresponding end-tag. Since this is not in the allowed URI list, these start and end tags are deleted, leaving the following in the filtered document:

<P>The headquarters of Organization-3 are moving to Amsterdam.</P>

Because the anchor tag is deleted, no link is displayed to the address that is not allowed.

Image maps are another mechanism for specifying linking information. Consider the following HTML document fragment:

<map name="bottom">

<area shape="rect" alt="Organization-3 Home Page"

coords="1, 1, 100, 50"

href="http://www.org3.com/"></area>

<area shape="rect" alt="Welcome Page"

coords="200, 300, 250, 350" href="/welcome.html"></area>

</map>

<a href="index.map"><img src="index.gif"

ISMAP="#bottom"></a>

Here a browser would display the image file, index.gif, with two hotspot rectangles, one in the upper left-hand corner and the other in the lower-right hand corner at the specified coordinates. The upper hotspot rectangle is a link to the Organization-3 home page, while the lower hotspot links to the welcome page in the same relative directory as the document fragment. If the Organization-3 home page is not allowed for the user, then the HTML filtering methods will detect and delete the area start-tag containing the attribute href="http://www.org3.com/" and the corresponding end-tag. The filtered document becomes:

<map name="bottom">

<area shape="rect" alt="Welcome Page"

coords="200, 300, 250, 350" href="/welcome.html"></area>

</map>

<a href="index.map"><img src="index.gif" border=0

ISMAP="#bottom"></a>

Display of this filtered HTML document presents only the lower hotspot linking to the welcome page in the same relative directory as the document fragment.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An apparatus for a user to browse markup language documents, the documents being stored for retrieval at one or more computer systems attached to a network and containing linking information representing addresses of network resources, the apparatus comprising:

an end-user device comprising processor, memory, network attachment, input means, and display, wherein the memory stores user profile records whose contents describe characteristics and preferences of the user relating to the user's restrictions to at least one of access to network resources and use of browser specific controls, and an application program comprising:

(i) instructions for causing the processor to perform an application function which displays an application window including application specific controls and data, wherein the application specific controls are responsive to the content of the user profile records and comprise a browser control, and (ii) instructions for causing the processor to perform, responsive to user activation of the browser control, a browser function which displays within the application window a browser sub-window including browser specific controls and markup language documents, wherein both the displayed browser specific controls and linking information retained in the displayed markup language documents are responsive to the content of the user profile records.

2. The apparatus of claim 1 wherein the browser specific controls comprise a location entry field for user input of linking information representing resource addresses to be accessed, and wherein the browser function displays or not the location entry field responsively to contents of the user profile records.

3. The apparatus of claim 1 wherein contents of the user profile records comprise an indication of allowed linking information, and wherein the browser function retains only allowed linking information in the displayed markup language documents, whereby the user can only access only allowed resources from a displayed markup language document.

4. The apparatus of claim 3 wherein the browser function filters markup language documents in order to delete linking information that is not indicated as allowed by contents of the user profile records.

5. The apparatus of claim 4 wherein the markup language documents comprise HTML documents, and wherein the browser function filters an HTML document by parsing the document to find href attributes, by locating linking information in found href attributes, by resolving addresses in located linking information to absolute addresses, and by deleting located linking information from the HTML document that is not indicated as allowed by contents of the user profile records.

6. The apparatus of claim 4 wherein the markup language documents comprise XML documents, and wherein the browser function filters an XML document by parsing the document for XLink elements, by locating linking information from all href attributes associated with found XLink elements, by resolving addresses in located linking information to full address, and by deleting located linking information from the XML document that is not indicated as allowed by contents of the user profile records.

7. The apparatus of claim 6 wherein the href attributes associated with an XLink element are either (i), if the XLink element has a simple type, located in the element start-tag, or (ii), if the XLink element has an extended type, located in locator and document element children of the XLink element.

8. The apparatus of claim 3 wherein the indication of allowed linking information indicates only whether or not entire markup language documents are allowed.

9. The apparatus of claim 1 wherein the memory also stores instructions for interpreting Java codes, and wherein the instructions of the application program comprise interpretable Java codes.

10. The apparatus of claim 1 wherein user profile or user directory databases are resident on one or more network attached computer systems, and wherein the application program further comprises instructions for downloading the user profile records from the user profile or user directory databases.

11. The apparatus of claim 1 further comprising business data server systems which provide business data requested by the end-user device.

12. The apparatus of claim 1, wherein the user profile records relate to the user's restrictions to access to network resources and use of browser specific controls.

13. The apparatus of claim 1, wherein said user profile records are created for each user but not by each user so that each user does not have access to his or her user profile record and cannot alter his or her user profile record.

14. A method for a user to browse markup language documents at an end-user device, the documents being stored for retrieval at one or more computer systems attached to a network and containing linking information representing resource addresses, the method comprising the steps of:

entering user identification information, authenticating entered user identification information and loading user profile records associated with the authenticated user to the end-user device, the user profile records relating to the user's restrictions to at least one of access to network resources and use of browser specific controls, displaying an application window at the end-user device including application specific controls and data, wherein the application specific controls are responsive to the content of the user profile records and comprise a browser control, and displaying, within the application window and responsively to user activation of the browser control, a browser sub-window including browser specific controls and markup language documents, wherein both the displayed browser specific controls and linking information retained in the displayed markup language documents are responsive to the content of the user profile records.

15. The method of claim 14 wherein the browser specific controls comprise a location entry field for user input of linking information representing resource addresses to be accessed, and wherein displaying or not of the location entry field in the browser sub-window is responsive to contents of the user profile records.

16. The method of claim 14 wherein contents of the user profile records comprise an indication of allowed linking information, and wherein displaying markup language documents in the browser sub-window retains only allowed linking information, whereby the user can access only allowed resources from displayed markup language documents.

17. The method of claim 16 wherein all linking information is indicated as allowed.

18. The method of claim 16 wherein displaying markup language documents further comprises filtering markup language documents before display to delete linking information that is not indicated as allowed by contents of the user profile records.

19. The method of claim 18 wherein the markup language documents comprise HTML documents, and wherein the filtering HTML markup language documents further comprises:

parsing an HTML document to find href attributes, locating linking information from the found href attributes, resolving addresses in located linking information to absolute addresses, and deleting located linking information that is not indicated as allowed by contents of the user profile records.

20. The method of claim 18 wherein the markup language documents comprise XML documents, and wherein the filtering XML markup language documents further comprises:

parsing an XML document to find XLink elements, locating linking information from all href attributes associated with found XLink elements, resolving addresses in located linking information to absolute addresses, and deleting located linking information that is not indicated as allowed by contents of the user profile records.

21. The method of claim 20 wherein the locating linking information further comprises finding all href attributes associated with a found XLink element by if the XLink element has a simple type, finding all href attributes in the element start-tag, and if the XLink element has an extended type, finding all href attributes in locator and document element children of the XLink element.

22. The method of claim 16 wherein the displaying a browser sub-window further comprises:

creating dynamically a homepage markup language document which includes the linking information indicated to be allowed, and displaying the homepage markup language document in the browser sub-window so that the allowed displayed linking information can be accessed by the user.

23. The method of claim 16 wherein the browser specific controls further comprise a control the activation of which causes display of a selection list presenting the linking information indicated to be allowed for user selection and access.

24. The method of claim 16 wherein the indication of allowed linking information indicates only whether or not entire markup language documents are allowed.

25. The method of claim 14 wherein user profile or user directory databases are resident on one or more network attached computer systems, and wherein loading the user profile records to the end-user device comprises downloading the user profile records across the network from the user profile or user directory databases.

26. The method of claim 14 further comprising, prior to the step of entering identification information, a step of directing a browser program active in the end-user device to a markup language document which causes loading of instructions into the end-user device for performing the subsequent steps of displaying an application window and displaying a browser sub-window.

27. The method of claim 14, wherein the user profile records relate to the user's restrictions to access to network resources and use of browser specific controls.

28. The method of claim 14, further comprising the steps of:

creating for each user but not by each user a user profile record, and preventing access by each user to his or her user profile record so that each user cannot alter his or her user profile record.

* * * * *